(No Model.)
BEST AVAILABLE COPY
E. THOMSON.
ELECTRIC METAL WORKING.
No. 396,014. Patented Jan. 8, 1889.
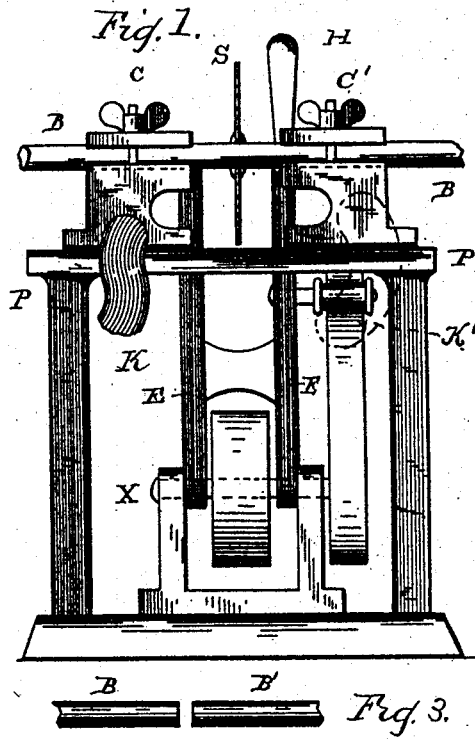
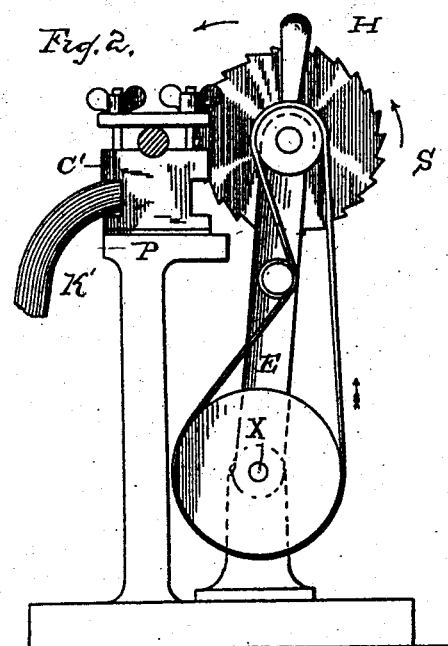
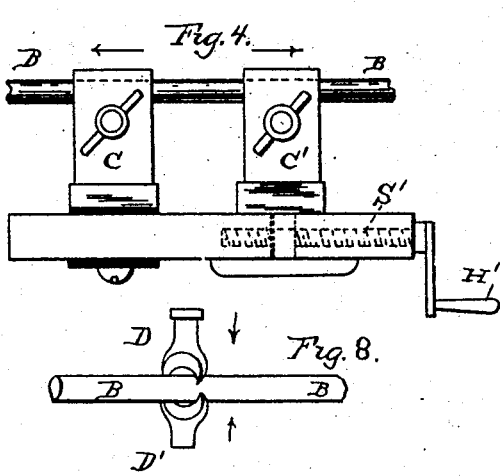
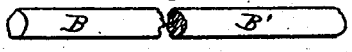
WITNESSES:
Ira R. Steward
Thos. H. Capel
INVENTOR,
Elihu Thomson
BY
H. L. Townsend
ATTORNEY.

UNITED STATES PATENT OFFICE.

ELIHU THOMSON, OF LYNN, MASSACHUSETTS.

ELECTRIC METAL WORKING.

SPECIFICATION forming part of Letters Patent No. 396,014, dated January 8, 1889.

Application filed October 8, 1888. Serial No. 287,501. (No model.)

*To all whom it may concern:*

Be it known that I, ELIHU THOMSON, a citizen of the United States, and a resident of Lynn, in the county of Essex and State of Massachusetts, have invented a certain new and useful Improvement in Electric Metal Working, of which the following is a specification.

My invention relates to methods or processes of metal working having for their object the separation of metal rods, bars, or pieces, or the local diminution of the section of the metal under treatment; and the invention consists in the novel art, method, or process, hereinafter described, of heating the metal rod, bar, or piece by an electric current of large volume or heating effect, and then, either during or after the heating and while the piece is hot, cutting or drawing or pulling the hot metal to separate the piece or to locally diminish or modify its cross-section. Sources of electricity suitable for the purposes of my invention are described in my prior patents on electric welding, &c., Nos. 347,140, 347,141, and 347,142.

Suitable clamps or holders are employed for holding the pieces while they are subjected to the heating and separating and reducing operations.

In the accompanying drawings, Figure 1 is a front elevation, and Fig. 2 a side elevation, of an apparatus suitable for use in dividing metal pieces after the manner of my invention. Fig. 3 is an example of work performed by such apparatus. Fig. 4 is a side view of an apparatus suitable for use in dividing or separating metal pieces by the electric heating and drawing or pulling operation. Figs. 5, 6, and 7 are examples of work done by said apparatus. Fig. 8 illustrates a modification in the process of dividing a piece of metal according to my invention, and Fig. 9 shows the piece divided by such modified process.

Referring to Figs. 1 and 2, C C' indicate suitable conducting-clamps, of any desired form or shape, mounted upon a proper table or support, P, and adapted to hold the bar, rod, or piece B B to be operated upon. The clamps C C' are suitably insulated from one another and are connected by cables or conductors K K' of large size with the source of heavy currents. The clamps may, if desired, be made adjustable to and from one another to vary the length of the piece subjected to the heating operation. By means of the cables K K', connected with the source—for instance such as that described in my Patent No. 385,386—heavy currents are passed through the piece between the clamps until the same is heated, say, to redness in the case of iron and steel, or to a less temperature for some other metals. When so heated, the revolving cutter S is brought against the bar or piece at or near its middle portion to separate the same. The cutter S may be mounted and operated in any desired manner. It is here shown as supported in a frame, E, centered on the main driving-shaft X, and provided with a suitable handle, H. The current should be shut off before the completion of the cut, which, with iron and steel at a bright-red heat, is very quickly accomplished.

Fig. 3 shows the piece B B severed into two pieces, B B', the line of the cut or separation being smooth and the form of the bar at the point of severance being preserved.

In Fig. 4 the clamps C C', mounted on a suitable support, are properly insulated from one another, and one of them—as, for instance, C'—may be pulled or drawn away from the other by the operation of a screw, S', having an operating-handle, H'. In using this device the bar B B is clamped firmly and heated by the current passed from clamp to clamp until it assumes a more or less plastic condition, when the clamps are drawn apart, thus thinning the bar or piece at the heated portion up to even the point of rupture. In the case of iron and steel which become plastic the metal may be drawn to a point, as indicated in Fig. 5, and if the heat be still more localized, as may be done by starting the operation with the clamps nearer together, the drawing or pulling action, when quickly performed, will result in the production of pieces like those shown in Fig. 6. If a piece be heated to a very high temperature, nearer fusing, and then the tension or pulling force be applied, the piece will separate or divide into the form such as shown in Fig. 7, drawing out very little. This action is also the result in the case of metals or alloys which do not assume a pasty or tenacious condition before melting.

If it be desired to sever or cut a bar or piece squarely by pulling or drawing it apart, it is well to nick the bar or piece by means of dies D D', Fig. 8, forced against it while cold or when hot, after which the sudden application of heating-current and tension will divide the bar at the nicked point, producing two pieces, as shown in Fig. 9.

With my invention the cutting off or reducing of stock—such as iron or steel bars—may be rapidly performed, and various forms of ends or sections where reduced or cut off may be readily obtained.

What I claim as my invention is—

1. The hereinbefore-described method of reducing or separating metal rods, bars, or pieces, consisting in heating the same by an electric current of large volume and then applying a suitable force to separate the metal or to extend the same at the heated section.

2. The herein-described novel art of cutting off or reducing the section of bars or rods, consisting in heating the bar or rod electrically at the point of division or reduction and then applying the proper separating or reducing power or force, as and for the purpose described.

Signed at Lynn, in the county of Essex and State of Massachusetts, this 26th day of September, A. D. 1888.

ELIHU THOMSON.

Witnesses:
J. W. GIBBONEY,
GEO. E. EMMONS.